(12) United States Patent
Gammel et al.

(10) Patent No.: US 10,992,464 B2
(45) Date of Patent: Apr. 27, 2021

(54) CHIP AND METHOD FOR SECURELY STORING SECRET DATA

(71) Applicant: Infineon Technologies AG, Neubiberg (DE)

(72) Inventors: Berndt Gammel, Markt-Schwaben (DE); Bernd Meyer, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 170 days.

(21) Appl. No.: 16/242,003

(22) Filed: Jan. 8, 2019

(65) Prior Publication Data
US 2019/0215156 A1    Jul. 11, 2019

(30) Foreign Application Priority Data

Jan. 9, 2018   (DE) .......................... 102018100357.9

(51) Int. Cl.
| | | |
|---|---|---|
| *H04L 9/08* | (2006.01) | |
| *H04L 9/32* | (2006.01) | |
| *H04L 9/00* | (2006.01) | |
| *G06F 21/60* | (2013.01) | |

(52) U.S. Cl.
CPC .......... *H04L 9/0861* (2013.01); *G06F 21/602* (2013.01); *H04L 9/003* (2013.01); *H04L 9/0897* (2013.01); *H04L 9/3247* (2013.01); *H04L 2209/046* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 6,278,783 B1 * | 8/2001 | Kocher | ................ H04L 9/0625 380/277 |
| 7,447,913 B2 | 11/2008 | Drexler et al. | |
| 7,720,225 B2 | 5/2010 | Gebotys | |

(Continued)

OTHER PUBLICATIONS

German Search Report based on application No. 10 2018 100 357.9 (8 pages) dated Dec. 20, 2018 (for reference purpose only).

(Continued)

*Primary Examiner* — Brandon S Hoffman
(74) *Attorney, Agent, or Firm* — Viering, Jentschura & Partner MBB

(57) ABSTRACT

A chip includes a processing device to perform cryptographic operations by secret data; a memory to store a first plurality of information portions that correspond to a first breakdown of the data and from which the secret data are reconstructible by combination of the first plurality of information portions; a random number generator to provide random values; and a conversion device to ascertain second breakdowns of the data into a second plurality of information portions, from which the secret data are reconstructible and to control the memory for an ascertained second breakdown to store the present second plurality of information portions. The conversion device is further configured to ascertain the second breakdowns based on the random values and/or to determine the interval of time between the ascertaining and storing of a second breakdown and the ascertaining and storing of the subsequent second breakdown based on the random values.

20 Claims, 4 Drawing Sheets

(56) References Cited

U.S. PATENT DOCUMENTS

2012/0215784 A1  8/2012 King et al.
2016/0048684 A1  2/2016 Kocher et al.
2016/0182486 A1  6/2016 Wo et al.

OTHER PUBLICATIONS

Skorobogatov, "Using Optical Emission Analysis for Estimating Contribution to Power Analysis", Published in: Workshop on Fault Diagnosis and Tolerance in Cryptography (FDTC), 2009.
Lohrke et al., "No Place to Hide: Contactless Probing of Secret Data on FPGAs",Cryptographic Hardware and Embedded Systems—CHES 2016, Lecture Notes in Computer Science, vol. 9813, pp. 147-167, Springer, Berlin.

\* cited by examiner

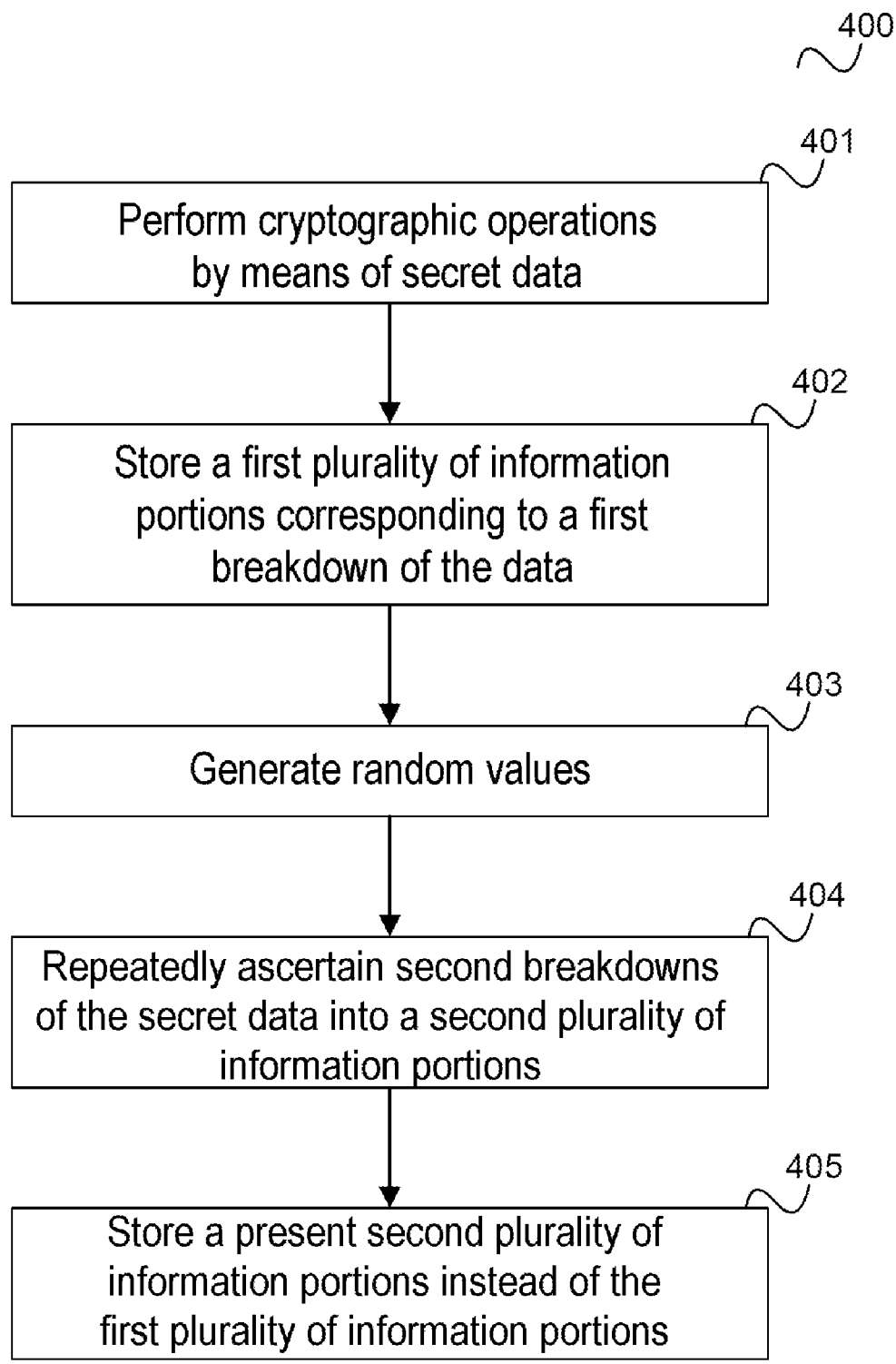

CHIP AND METHOD FOR SECURELY STORING SECRET DATA

CROSS-REFERENCE TO RELATED APPLICATION

This application claims priority to German Patent Application Serial No. 10 2018 100 357.9, which was filed Jan. 9, 2018, and is incorporated herein by reference in its entirety.

TECHNICAL FIELD

Various embodiments relate generally to chips and methods for securely storing secret data.

BACKGROUND

Electronic devices need to be protected against attacks in a large number of applications. Typical examples are security ICs, hardware roots of trust (e.g. trusted platform module), chip cards for processing and storing secret data (e.g. keys or passwords) or data that are supposed to be protected against manipulation (e.g. credit on a prepaid card) or controllers, for example in a vehicle, whose correct operation is important for the safety of a user. A possible point of attack in an electronic device is its memory, reading or manipulation of which allows an attacker to find out secret data. Therefore, efficient mechanisms for protecting electronic memories are desirable.

SUMMARY

A chip includes a processing device to perform cryptographic operations by secret data; a memory to store a first plurality of information portions that correspond to a first breakdown of the data and from which the secret data are reconstructible by combination of the first plurality of information portions; a random number generator to provide random values; and a conversion device to ascertain second breakdowns of the data into a second plurality of information portions, from which the secret data are reconstructible and to control the memory for an ascertained second breakdown to store the present second plurality of information portions. The conversion device is further configured to ascertain the second breakdowns based on the random values and/or to determine the interval of time between the ascertaining and storing of a second breakdown and the ascertaining and storing of the subsequent second breakdown based on the random values.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a method for securely storing secret data according to one embodiment.

DESCRIPTION

The following detailed description refers to the accompanying drawings that show, by way of illustration, specific details and embodiments in which the invention may be practiced.

The detailed description that follows relates to the accompanying figures, which show details and embodiments. These embodiments are described in such detail that a person skilled in the art can implement the invention. Other embodiments are also possible and the exemplary embodiments can be altered in structural, logical and electrical respects without departing from the subject matter of the invention. The different embodiments are not necessarily mutually exclusive, but rather different embodiments can be combined with one another, so that new embodiments are obtained. Within the scope of this description, the terms "connected" and "coupled" are used to describe both a direct and an indirect connection and also a direct or indirect coupling.

Figure 1:
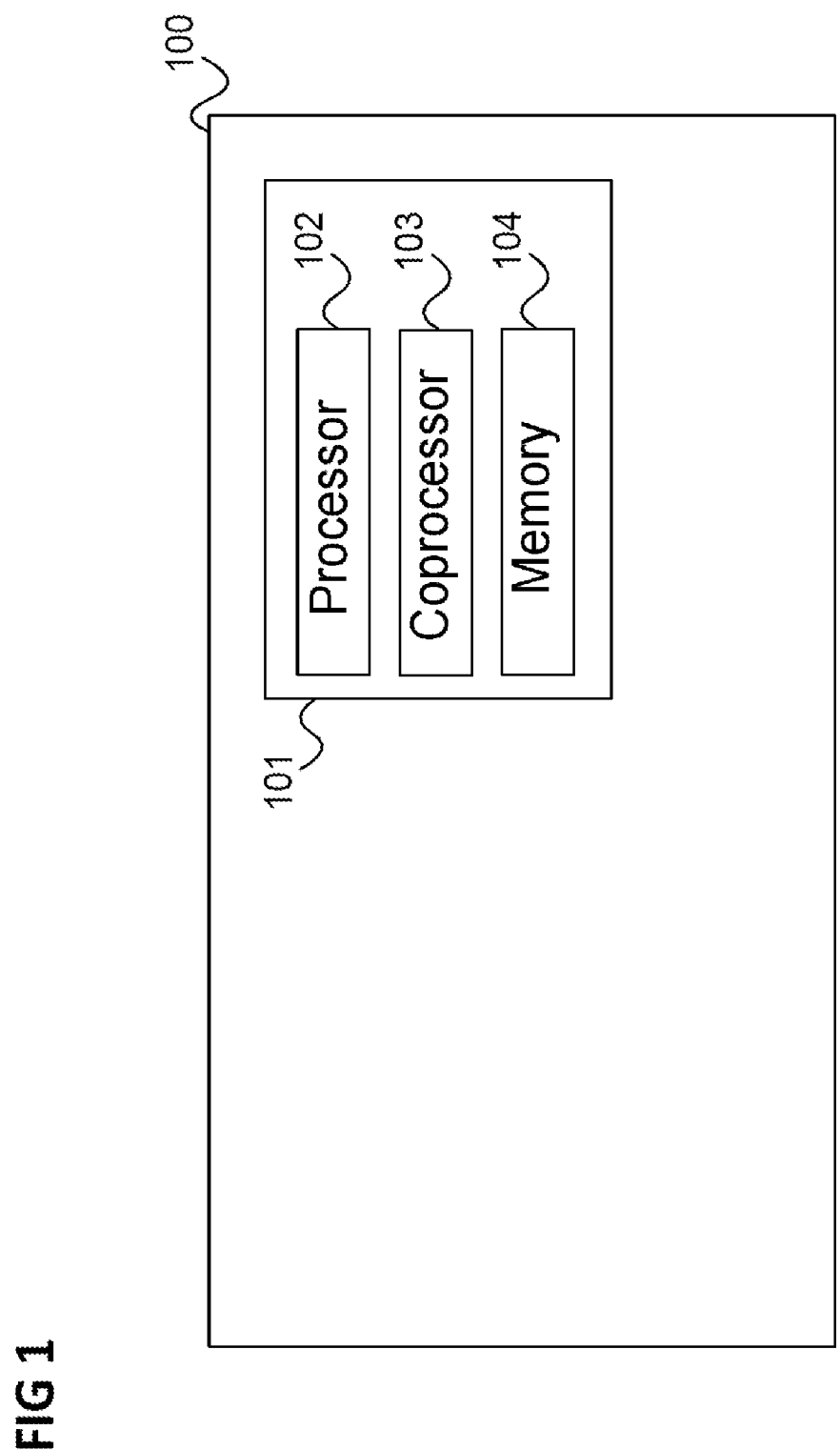
FIG. 1 shows an example of a data processing apparatus.

FIG. 1 shows an example of a data processing apparatus 100.

The data processing apparatus 100 may be a controller or a microcontroller in a vehicle, e.g. an ECU (electronic control unit) in an automobile. It may also be a chip card IC (integrated circuit) of a chip card such as a smartcard having any form factor, e.g. for a passport or for an SIM (subscriber identity module).

The data processing apparatus 100 has an integrated circuit in the form of a chip 101. The chip 101 may be a control chip and, for example, may implement a processor 102, a coprocessor 103 (e.g. a cryptoprocessor) and/or a memory 104. The chip 101 may also be an RFID (radio frequency identification) chip or may implement an SIM (subscriber identity module) for a cellphone, for example. The chip 101 may be intended for a security application, i.e. may be a security chip. By way of example, the memory 102 stores secret data that are used for a cryptographic operation, e.g. for authenticating a user or for encrypting/decrypting or signing data.

Various optoelectronic measurement methods are used for error analysis in an integrated circuit 101 that are also able to be misused for analyzing security chips and for carrying out attacks (for example the reading of secret key material from the memory 102). These methods are based on photon-electron interactions and are applied from the reverse of the chip through the semiconductor substrate. They are advantageous for an attacker from multiple aspects:

They are much less invasive methods of attack than focused ion beam (FIB) or direct probing by means of needles, for example.

They can simultaneously attack a relatively large area of the chip, which may include many signals and transistors.

The same optical techniques can be employed that are also used for exposure to light during fabrication of the wafers (for example immersion lenses). This allows extremely high resolutions to be achieved for the subsequent evaluation of the attacked structures.

All conventional optoelectronic measurement methods in use have the disadvantage that observation of the emitted or reflected photons is technically very complex. The underlying physical phenomena produce only extremely weak signals and the measurement techniques used are susceptible to noise and interference (thermal noise, dark count rate, recovery time of the optical sensors, noise of the amplifiers, quantization noise during digitization, etc.) and need to be exactly synchronized to the timing response of the signals to be observed. In order to improve the signal-to-noise ratio to a level that allows safe analysis, the measurements are usually repeated multiple times and the results are statistically evaluated (for example by forming the mean value or the median) or the emitted photons are integrated by physical processes in the measurement electronics sensors themselves. This approach implies that the states to be measured in the semiconductor material need to remain stable in a manner reproducible for an attacker or at least over a certain period, which is dependent on the measurement method used.

Similar approaches are used for conventional side channel analysis (e.g. timing attacks, single power analysis, differential power analysis, electromagnetic analysis, error analysis, differential error analysis). These side channel attacks increase the locality of statistical attacks in time and space by forming hypotheses about calculated interim results, which are ideally only dependent on a small number of the data to be attacked, and subsequently dividing the measured values into classes on the basis of the hypotheses formed.

The methods under consideration here for error analysis of integrated circuits can be generally divided into two classes:

Differential measurement methods: differential methods allow the attacker to observe dynamic changes in the electrical potentials in the semiconductor material (for example photon emission as a result of luminescence of hot charge carriers during switching processes, PICA (picosecond imaging circuit analysis) and PEM (photon emission microscopy methods). It is thus possible to observe potential changes in the semiconductor material from "0" to "1" or vice versa. The relative change in the potentials at the transition allows an attacker to directly infer what the starting value (or final value) was. These methods include the cited PICA and PEM methods, for example, which evaluate the photons emitted during a transition.

Absolute measurement methods: absolute measurement methods involve static potentials being measured and the measured value is directly related to the observed potential in the semiconductor material. For example, in the case of LVP (laser voltage probing) or LVI (laser voltage imaging), electrical potentials at pn junctions are determinable indirectly by measuring the amplitude or phase modulation of reflected laser light. These analysis methods are subsequently referred to as LVx.

If the measurement equipment used does not react too sluggishly, absolute measurement methods also allow analysis of the relative change in the measured values in the event of a potential change in the semiconductor material from "0" to "1" or vice versa, in order to be able to infer the initial value (or final value). However, they also allow the performance of template attacks. For a template attack, it is assumed that the attacker initially, in a learning phase, has control over the chip to be analyzed and in particular can prescribe values of signals and registers of interest as desired and can determine the associated measured values. In this way, he is able to determine the absolute measured values of signals and memory cells to be attacked in the "0" and "1" state up to a certain measurement accuracy. In the subsequent evaluation phase, the attacker attacks a protected chip containing information to be protected by means of measurements. The attacker determines the measured value for an unknown value of a signal or of a stored bit and can then infer the logic value of this signal or bit from the previously learned absolute measured values. Using this approach, absolute measurement methods also allow the analysis of static logic values in a security IC.

Probing attacks (for example by means of probing needles) can be countered by using randomization and masking of signals and stored values as protective measures. In this case, it is typically the aim to spatially distribute information to be protected over two or more signals. As customary with secret sharing techniques, the information is distributed such that a subset of the information portions (that is to say of the distributed information) provides no information about the distributed information. Typically, at least one of the signals to which the information is distributed is physically protected against probing by means of specific routing (e.g. by means of secure wiring). To calculate the information portions, random or pseudorandom data not correlated to the target signal are used. So that these countermeasures also protect against side channel attacks, all (in particular nonlinear) calculations performed on the distributed signals also need to be randomized. Otherwise, the formation of local hypotheses and subsequent statistical evaluation of measurement series is in turn possible.

All randomization and masking processes are carried out once, typically only at the beginning of a lengthy calculation, for performance reasons when cryptographic algorithms are implemented. Some computation operations on masked values and some implementation techniques (e.g. threshold value implementation to protect against side channel attacks) can require the randomization to be refreshed for intermediate results during the calculation using new random numbers. Typically, values stored in information portions are not recoded or refreshed without algorithmic necessity, however, owing to the relatively high computation complexity.

Circuit parts that frequently process changing data (for example databuses) are typically protected by means of dynamic masking methods. In this case, a random number generator generates a sequence of genuine or pseudorandom random bits that, as in the case of a stream cipher, is used for masking the data to be protected. In one implementation variant, the mask bits are transmitted from the sender to the receiver together with the masked data and are then processed further by the receiver circuit. In a second implementation variant, the circuit for generating the random masking bits is installed on the sender and the receiver. Both random number generators then generate the same random sequence with synchronous timing and it is then only necessary for the masked data bits to be transmitted.

According to various embodiments, mechanisms are provided that prevent the measurement of information to be protected by resulting in measured values being correlated sufficiently randomly and/or not to the information to be protected. In various embodiments, it is possible to prevent conclusions about the actual value of measured signals or bits from being possible by means of statistical analyses or by means of integration.

Figure 2:
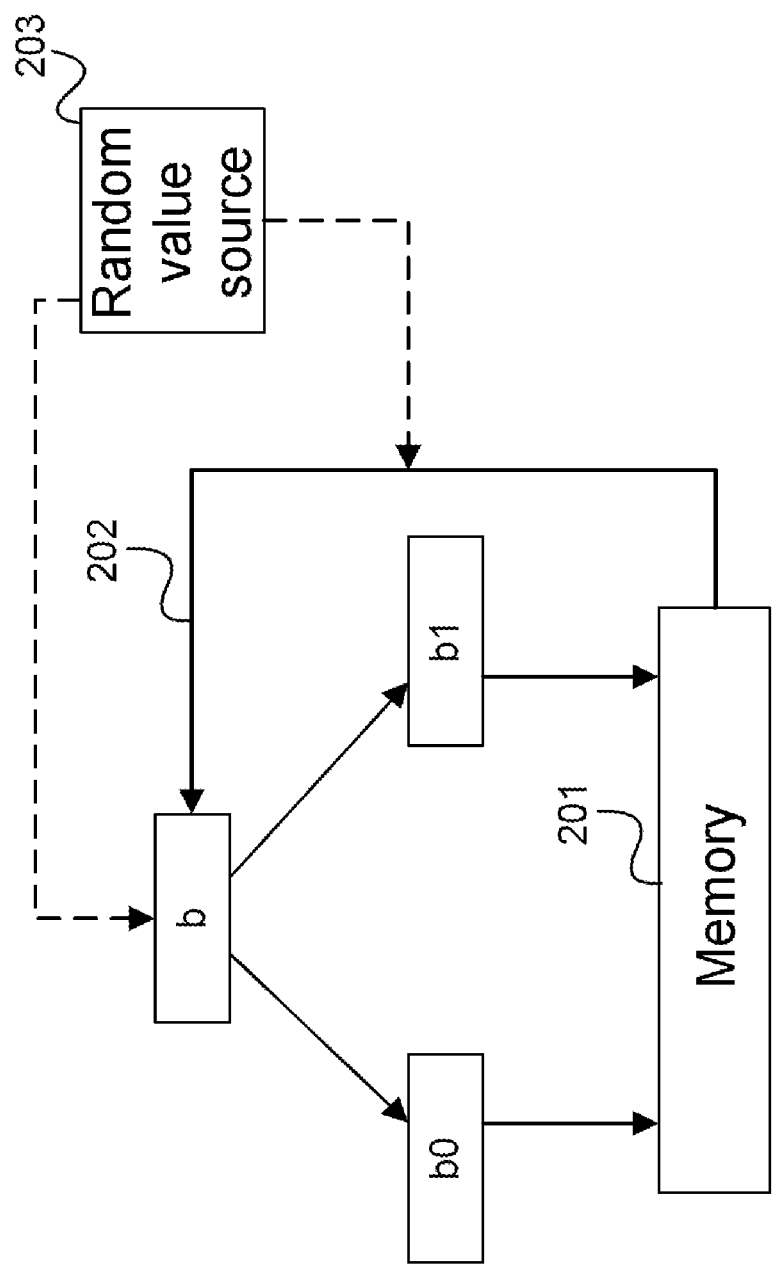
FIG. 2 illustrates a mechanism for protecting secret data according to one embodiment.

FIG. 2 illustrates a mechanism for protecting secret data according to one embodiment.

The value of a bit b is represented by two information portions (shares) b0 and b1 that can be combined such that the bit b is obtained. The information portions b0 and b1 are themselves bits, for example, and it holds that b=b0⊕b1, the addition operator being a logic exclusive-OR operation (XOR operation). The information of the bit b is stored in a memory 200 by virtue of the information portions b0 and b1 being stored in the memory 201. The memory 201 corresponds to the memory 104, for example, and the bit b is a portion of secret data (which consists of multiple such bits b) that are used by the processor 102 or the coprocessor 103 for one or more cryptographic operations.

After a prescribed time interval, the bit b is then broken down, as symbolized by the arrow 202, into two information portions again using a random value source 203, said information portions being stored in the memory 201.

In this case, the maximum length of the prescribed time interval, during which the data are stable (i.e. the time interval between a breakdown and a new breakdown and overstoring of the old breakdown), is chosen such that at no time does information stored in b0 and b1 remain stable for long enough to be able to perform, by way of example, an LVx attack, for example no longer than 1 ms, 5 ms or 10 ms.

According to one embodiment, the information portions are generated periodically. By way of example, b0 is the value of a nonpredictable (pseudo)random random value source 203 (random number generator). The random value source 203 generates a new symbol (bit) within a prescribed time interval.

According to one embodiment, the values b0 and b1 are inverted for a new breakdown of the bit b. In this case, there is provision for the time of the change (i.e. the fresh ascertainment of the new breakdown and storing of the new breakdown in the memory 201) not to be predictable by the attacker. By way of example, the time of the change is dependent on a random value provided by the random value source 203.

To this end, a pseudorandom number generator whose internal state has sufficient entropy to make hypothesis formation using the complete state space practically impossible for an attacker can be used for the random value source 203. By way of example, the pseudorandom number generator can be implemented on the basis of a feedback shift register. The internal initial state can be produced by a physical noise source, for example, so that the generated output sequence is not predictable by the attacker.

In this embodiment, the information portions can also be determined on the basis of random values.

Stored values can also be spatially permuted in the memory. For example, an n-bit value in a register is rotated through a distance d. The n-bit value may have both information portions b0, b1 for multiple bits b, for example, or else just the first information portions b0 and after the rotation the associated second information portions b1 are calculated for each digit of the n-bit value in a manner suited to the information portions b1.

The rotation can also itself correspond to the breakdown of data: secret bits b form a word that is rotated through a particular number of bits (rotation distance). The bits of the rotated word form the bits b0 and the binary representation of the rotation distance forms the bits b1.

A rotation process is performed within a time window that is so short that LVP attacks are prevented. Since this countermeasure can leak the Hamming weight of the n-bit value, there may be provision for further protective measures. In this case too, the time of the rotation and/or the distance d can be chosen (pseudo)randomly. The rotation distance can be carried in a further register.

The mean symbol rate of the random value source 203 is chosen, by way of example, such that the additional load on the integrated circuit that has the memory 201 from the current draw on the basis of the updates of the breakdowns of bits b to be stored and the random value source is low and is in the region of a few percentage points of the total current draw of the circuit, for example.

The above described mechanism can be implemented with little additional complexity: in chips for security applications, secret data for protecting against probing and side channel attacks are typically masked and are stored in a manner distributed as information portions. The additional circuit complexity for changing (for example inverting, rotating or remasking) the stored information portions is relatively low. The largest portion of the area requirement arises from the memory 201 needed for storing the information portions.

However, changing the breakdown (i.e. negating the stored information portions) and generating the signals necessary therefor (e.g. from the random value source 203) result in additional activity in the integrated circuit. To prevent these state changes from also causing an increased current draw in subsequent circuit portions that are dependent on the values, the signal paths can be separated from one another by gating, for example by register stages, latches or else appropriate combinatorial switching elements.

According to one embodiment, stored values can also be safeguarded in the sleep mode of a processor, e.g. of an integrated circuit. This means a sleep mode in which e.g. the clock of the integrated circuit is switched off and e.g. the supply voltage of the integrated circuit (VDD) is also lowered until, although the stored values are still maintained, no further operation is possible (and, by way of example, the repeated fresh breakdown of stored bits, as described with reference to FIG. 2, is also suspended). This state is particularly at risk, since an attacker actually has any amount of time to perform a large number of LVP measurements.

For protection, on the other hand, there may be provision for encrypting stored values by means of a secret key. Since an attacker can possibly read the encrypted values by LVx, it is necessary for the security of the key against LVx attacks to be ensured. To this end, it is possible to use a key that cannot be read by means of LVx in the sleep mode. This can be achieved by means of a key that is generated on the basis of a PUF (physical uncloneable function) when it is needed or by virtue of the key being stored in a nonvolatile memory. The key can firstly be chosen in constant fashion or the key is recurrently chosen afresh (session key). In this case, it is assumed that a nonvolatile memory is available that, in the sleep state (i.e. switched-off state), cannot be read by means of LVx (which must also be true for the PUF).

For example, a secret value is represented by two or more information portions (e.g. by b=b0 ⊕b1) and stored, the representation being refreshed at particular intervals of time as described above. If the integrated circuit now enters the sleep mode, one of the information portions, e.g. the value b0, is stored (and in this case not necessarily encrypted) in a nonvolatile memory and the value b0 of the information portion in the (main) memory 201 is overwritten (e.g. by zeros or a random number). Although the attacker can then read b1 by LVx, he is provided with no information about the complete secret (the value b). On waking from the sleep mode, the integrated circuit transfers the value b0 from the nonvolatile memory again to the memory 201 and can immediately use it again. This approach is very efficient because no encryption is required.

Figure 3:
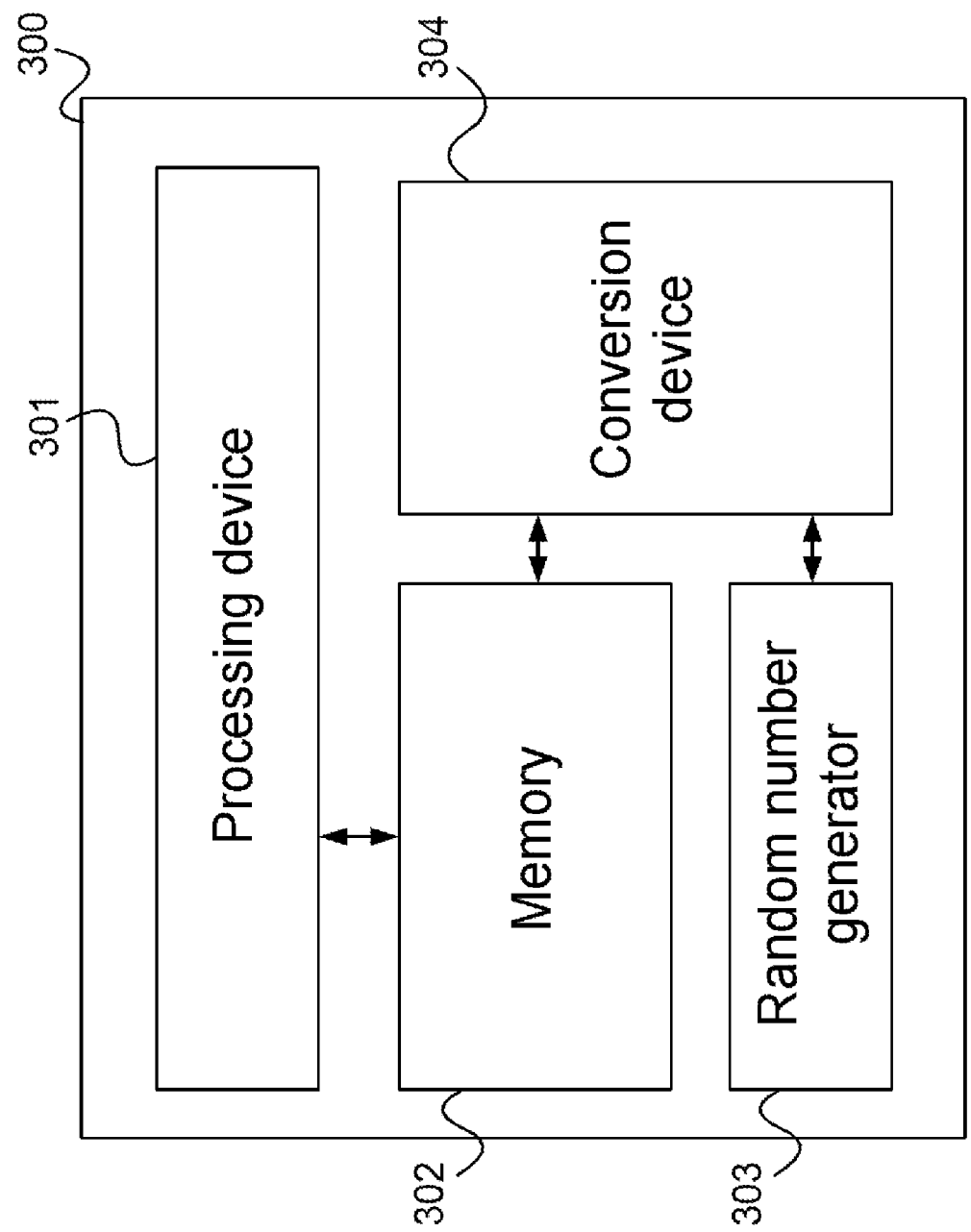
FIG. 3 shows a chip according to one embodiment.

According to various embodiments, a chip is provided, as depicted in FIG. 3.

FIG. 3 shows a chip 300 according to one embodiment.

The chip 300 has a processing device 301 configured to perform cryptographic operations by means of secret data, and a memory 302 configured to store a first plurality of information portions that correspond to a first breakdown of the data and from which the secret data are reconstructible by means of combination of the first plurality of information portions.

The chip 300 further has a random number generator 303 configured to provide random values.

Additionally, the chip 300 has a conversion device 304 configured to repeatedly ascertain second breakdowns of the data into a second plurality of information portions, from which the secret data are reconstructible by means of combination of the second plurality of information portions, in a period of time in which the chip 300 does not use the data for a cryptographic operation and to control the memory 302 for at least one ascertained second breakdown to store the second plurality of information portions instead of the first plurality of information portions.

The conversion device 304 is configured to ascertain the second breakdowns based on the random values and/or to determine the interval of time between the ascertaining and storing of a second breakdown and the ascertaining and storing of the subsequent second breakdown based on one of the random values.

In other words, according to various embodiments, multiple breakdowns of secret data are ascertained and stored in succession, with a present breakdown replacing the preceding breakdown in the memory. In this case, at least one of the breakdowns and/or the intervals of time between the breakdowns (and storage thereof) is based on random values.

The conversion device can control the memory, for example for each ascertained second breakdown, to store the second plurality of information portions instead of the first plurality of information portions. Alternatively, there may be one or more second breakdowns that are not stored by the memory, i.e. some of the second breakdowns are omitted in so far as they are not stored, but rather e.g. are rejected.

By way of example, secret information (data) is stored in randomized fashion (for example in randomly masked or randomly rotated fashion). The present values of the stored information portions of a data value (for example a masked datum plus associated mask or rotated value plus rotation distance) are renewed within a prescribed or random time interval.

According to various embodiments, secret sharing techniques prevent the spatial location of the information. As a result of the values of the information portions used needing to change within a particular (possibly random) time interval, temporal location of the information is prevented. The temporal and spatial randomization measures together cause the spatial and temporal reproduction of states that are the prerequisite for statistical measures or integration for improving the signal-to-noise ratio to be prevented.

In order to additionally bypass attacks by means of hypothesis formation and subsequent statistical evaluations of measurement series (as is customary with side channel attacks, for example), both the masks used for calculating the information portions and the times at which the information portions are modified (for example inverted), for example, are determined such that they are not predictable and not correlated to the value of the stored bit.

FIG. 4 shows a method for securely storing secret data according to one embodiment.

In 401, cryptographic operations are performed by means of secret data.

In 402, a first plurality of information portions that correspond to a first breakdown of the data and from which the secret data are reconstructible by means of combination of the first plurality of information portions is stored.

In 403, random values are generated.

In 404, second breakdowns of the secret data into a second plurality of information portions, from which the secret data are reconstructible by means of combination of the second plurality of information portions, are repeatedly ascertained in a period of time in which the data are not used for a cryptographic operation.

In 405, after a present second breakdown is ascertained, the present second plurality of information portions is stored instead of the first plurality of information portions.

In this case, the second breakdowns are ascertained on the basis of the random values and/or the intervals of time between the ascertaining and storing of a second breakdown and the ascertaining and storing of the subsequent second breakdown are determined on the basis of one of the random values.

It should be borne in mind that the order shown in FIG. 4 is not imperative. By way of example, the cryptographic operations can be performed repeatedly and second breakdowns can be repeatedly ascertained and stored in the pauses between cryptographic operations.

This ensures that the same breakdown does not remain static for too long and an attacker can not read the secret data. It is also possible for second breakdowns to be ascertained and stored during the cryptographic operations.

Various embodiments are specified below.

Exemplary embodiment 1 is a chip as described with reference to FIG. 3.

Exemplary embodiment 2 is a chip according to exemplary embodiment 1, wherein the intervals of time are restricted by a prescribed value.

Exemplary embodiment 3 is a chip according to exemplary embodiment 2, wherein the prescribed value is less than or equal to 10 ms.

Exemplary embodiment 5 is a chip according to exemplary embodiment 2 or 3, wherein the period of time is a period of time that is at least ten times longer than the interval of time indicated by the prescribed value.

Exemplary embodiment 6 is a chip according to one of exemplary embodiments 1 to 5, wherein the conversion device ascertains at least ten second breakdowns during the period of time and controls the memory to store said breakdowns.

Exemplary embodiment 7 is a chip according to one of exemplary embodiments 1 to 6, wherein the secret data contain a cryptographic key.

Exemplary embodiment 8 is a chip according to one of exemplary embodiments 1 to 7, wherein the period of time is a period of time in which the processing device does not read the secret data.

Exemplary embodiment 9 is a chip according to one of exemplary embodiments 1 to 8, wherein the cryptographic operation is an encryption, a decryption, a signing or a signature verification.

Exemplary embodiment 10 is a chip according to one of exemplary embodiments 1 to 9, wherein the combination of information portions combines corresponding digits of the information portions bit by bit.

Exemplary embodiment 11 is a chip according to one of exemplary embodiments 1 to 10, wherein the combination of information portions is an arithmetic combination of the information portions.

Exemplary embodiment 12 is a chip according to one of exemplary embodiments 1 to 11, wherein the combination of information portions is an addition of the information portions.

Exemplary embodiment 13 is a chip according to one of exemplary embodiments 1 to 12, wherein the memory is a key register.

Exemplary embodiment 14 is a chip according to one of exemplary embodiments 1 to 13, wherein the breakdowns are in each case breakdowns into masked data and masks.

Exemplary embodiment 15 is a chip according to one of exemplary embodiments 1 to 14, wherein the breakdowns are in each case breakdowns into rotated data and rotation distances.

Exemplary embodiment 17 is a method for securely storing secret data as described with reference to FIG. 4.

Exemplary embodiment 18 is a method according to exemplary embodiment 17, wherein the intervals of time are restricted by a prescribed value.

Exemplary embodiment 19 is a method according to exemplary embodiment 18, wherein the prescribed value is less than or equal to 10 ms.

Exemplary embodiment 20 is a method according to exemplary embodiment 18 or 19, wherein the period of time in which the secret data are not used for a cryptographic operation is a period of time that is longer by a (integer) multiple than the interval of time indicated by the prescribed value that restricts the intervals of time.

Exemplary embodiment 21 is a method according to exemplary embodiment 18 or 19, wherein the period of time is a period of time that is at least ten times longer than the interval of time indicated by the prescribed value.

Exemplary embodiment 22 is a method according to one of exemplary embodiments 17 to 21, wherein at least ten second breakdowns are ascertained and stored during the period of time.

Exemplary embodiment 23 is a method according to one of exemplary embodiments 17 to 22, wherein the secret data contain a cryptographic key.

Exemplary embodiment 24 is a method according to one of exemplary embodiments 17 to 23, wherein the period of time is a period of time in which the secret data are not read.

Exemplary embodiment 25 is a method according to one of exemplary embodiments 17 to 24, wherein the cryptographic operation is an encryption, a decryption, a signing or a signature verification.

Exemplary embodiment 26 is a method according to one of exemplary embodiments 17 to 25, wherein the combination of information portions combines corresponding digits of the information portions bit by bit.

Exemplary embodiment 27 is a method according to one of exemplary embodiments 17 to 26, wherein the combination of information portions is an arithmetic combination of the information portions.

Exemplary embodiment 28 is a method according to one of exemplary embodiments 17 to 27, wherein the combination of information portions is an addition of the information portions.

Exemplary embodiment 29 is a method according to one of exemplary embodiments 17 to 28, wherein the first plurality of information portions and the present second plurality of information portions are stored in a key register.

Exemplary embodiment 30 is a method according to one of exemplary embodiments 17 to 29, wherein the breakdowns are in each case breakdowns into masked data and masks.

Exemplary embodiment 31 is a method according to one of exemplary embodiments 17 to 30, wherein the breakdowns are in each case breakdowns into rotated data and rotation distances.

Exemplary embodiment 32 is a method according to one of exemplary embodiments 17 to 31, wherein the information portions are bits or words including multiple bits.

According to a further embodiment, a chip is provided that has a memory device configured to repeatedly store secret data by storing a breakdown of the secret data into information portions from which the secret data are reconstructible, wherein the memory device is configured to ascertain a new breakdown from a previous breakdown on the basis of a random source, with times of previous breakdowns also being able to be received as input information. The interval of time between the breakdown and a previous breakdown can also be determined by a random source or else occur at predetermined intervals. The interval of time in this case does not exceed a prescribed limit that, by way of example, is chosen such that an LVx attack is prevented, in particular if the secret data are not used by the chip (e.g. for a cryptographic operation). This ensures that the secret data are not present in the memory in stable fashion for too long when they are not used, and thus prevents the data from becoming vulnerable to attacks.

According to a further embodiment, an apparatus for securely storing secret data is provided, having: means for performing cryptographic operations by means of secret data; means for storing a first plurality of information portions that correspond to a first breakdown of the data and from which the secret data are reconstructible by means of combination of the first plurality of information portions; means for generating random values; means for repeatedly ascertaining second breakdowns of the secret data into a second plurality of information portions, from which the secret data are reconstructible by means of combination of the second plurality of information portions, in a period of time in which the data are not used for a cryptographic operation, and means for storing after a present second breakdown has been ascertained, the present second plurality of information portions instead of the first plurality of information portions, wherein the second breakdowns are ascertained based on the random values and/or the intervals of time between the ascertaining and storing of a second breakdown and the ascertaining and storing of the subsequent second breakdown are determined based on one of the random values.

According to one embodiment, a chip is provided having a processing device configured to perform cryptographic operations by means of secret data, a memory configured to store a first plurality of information portions that correspond to a first breakdown of the data and from which the secret data are reconstructible by combination of the first plurality of information portions, a random number generator configured to provide random values and a conversion device configured to repeatedly ascertain second breakdowns of the data into a second plurality of information portions, from which the secret data are reconstructible by combination of the second plurality of information portions, in a period of time in which the chip does not use the data for a cryptographic operation and to control the memory for at least one ascertained second breakdown to store the second plurality of information portions instead of the first plurality of information portions, wherein the conversion device is configured to ascertain the second breakdowns based on the random values and/or to determine the interval of time between the ascertaining and storing of a second breakdown and the ascertaining and storing of the subsequent second breakdown based on one of the random values.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip, comprising:
   a processing device configured to perform cryptographic operations by secret data;
   a memory configured to store a first plurality of information portions that correspond to a first breakdown of the data and from which the secret data are reconstructible by combination of the first plurality of information portions;
   a random number generator configured to provide random values;
   a conversion device configured to repeatedly ascertain second breakdowns of the data into a second plurality of information portions, from which the secret data are reconstructible by combination of the second plurality of information portions, in a period of time in which the chip does not use the secret data for a cryptographic operation and to control the memory for at least one ascertained second breakdown to store the present second plurality of information portions instead of the first plurality of information portions;
   wherein the conversion device is further configured to at least one of ascertaining the second breakdowns based on the random values or determining the interval of time between the ascertaining and storing of a second breakdown and the ascertaining and storing of the subsequent second breakdown based on the random values.

2. The chip of claim 1,
   wherein the intervals of time are restricted by a prescribed value.

3. The chip of claim 2,
   wherein the prescribed value is less than or equal to 10 ms.

4. The chip of claim 2,
   wherein the period of time in which the chip does not use the secret data for a cryptographic operation is a period of time that is longer by a multiple than the interval of time indicated by the prescribed value that restricts the intervals of time.

5. The chip of claim 2,
   wherein the period of time is a period of time that is at least ten times longer than the interval of time indicated by the prescribed value.

6. The chip of claim 1,
   wherein the conversion device ascertains at least ten second breakdowns during the period of time and controls the memory to store said breakdowns.

7. The chip of claim 1,
   wherein the secret data contain a cryptographic key.

8. The chip of claim 1,
   wherein the period of time is a period of time in which the processing device does not read the secret data.

9. The chip of claim 1,
   wherein the cryptographic operation is an encryption, a decryption, a signing or a signature verification.

10. The chip of claim 1,
    wherein the combination of information portions combines corresponding digits of the information portions bit by bit.

11. The chip of claim 1,
    wherein the combination of information portions is an arithmetic combination of the information portions.

12. The chip of claim 1,
    wherein the combination of information portions is an addition of the information portions.

13. The chip of claim 1,
    wherein the memory is a key register.

14. The chip of claim 1,
    wherein the breakdowns are in each case breakdowns into masked data and masks.

15. The chip of claim 1,
    wherein the breakdowns are in each case breakdowns into rotated data and rotation distances.

16. The chip of claim 1, wherein the conversion device is configured to determine the interval of time between the ascertaining and storing of a second breakdown and the ascertaining and storing of the subsequent second breakdown based on the random values.

17. A method for securely storing secret data, the method comprising:
    performing cryptographic operations by secret data;
    storing a first plurality of information portions that correspond to a first breakdown of the data and from which the secret data are reconstructible by combination of the first plurality of information portions;
    generating random values;
    repeatedly ascertaining second breakdowns of the secret data into a second plurality of information portions, from which the secret data are reconstructible by combination of the second plurality of information portions, in a period of time in which the data are not used for a cryptographic operation, and,
    after a present second breakdown has been ascertained, storing the present second plurality of information portions instead of the first plurality of information portions, wherein the second breakdowns are ascertained based on at least one of the random values or the intervals of time between the ascertaining and storing of a second breakdown and the ascertaining and storing of the subsequent second breakdown are determined based on the random values.

18. The method of claim 17,
    wherein the intervals of time are restricted by a prescribed value.

19. The method of claim 18,
    wherein the prescribed value is less than or equal to 10 ms.

20. The method of claim 18,
    wherein the period of time in which the secret data are not used for a cryptographic operation is a period of time that is longer by a multiple than the interval of time indicated by the prescribed value that restricts the intervals of time.

* * * * *